United States Patent Office.

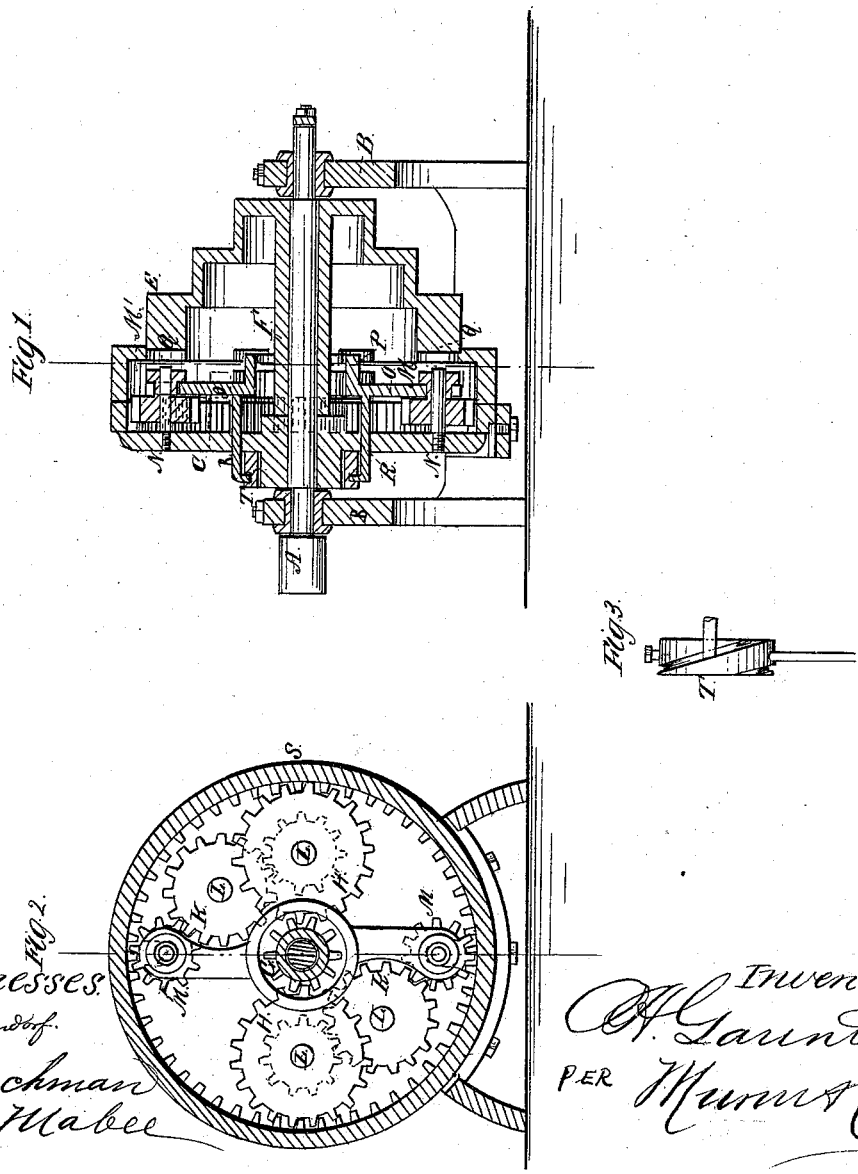

ADIN GAUNTT, OF CHAGRIN FALLS, OHIO.

Letters Patent No. 91,929, dated June 29, 1869.

APPARATUS FOR CHANGING SPEED IN MACHINERY.

The Schedule referred to in these Letters Patent and making part of the same.

*To all whom it may concern:*

Be it known that I, ADIN GAUNTT, of Chagrin Falls, in the county of Cuyahoga, and State of Ohio, have invented a new and improved Apparatus for Reducing Rotary Motion; and I do hereby declare that the following is a full, clear, and exact description thereof, which will enable others skilled in the art to make and use the same, reference being had to the accompanying drawing, forming part of this specification.

This invention relates to improvements in means for reducing motion, applicable for gearing the live spindles of turning-lathes, also hoisting-drums, capstans, and other similiar machinery, where it is desirable to obtain a slow and strong rotary moving part from a rapidly-moving prime mover, and in as compact form as possible.

The invention consists of an arrangement of reducing-gear within the space enclosed by a set of hollow conical pulleys, having a fast motion, whereby a slow and powerful motion is imparted to a live spindle, as the spindle of a lathe, or other rotary shaft having the same axis of motion as that of the said pulleys, and adapted to disconnect the reducing-gear and connect the said shaft or spindle directly to the pulleys, so as to move at the same speed that they do, when required, all substantially as hereinafter more fully specified.

Figure 1 represents a longitudinal sectional elevation of my improved apparatus.

Figure 2 represents a transverse section of the same, taken on the line $x$–$x$ of fig. 1.

Figure 3 represents a detail view of a part of the shifting-device.

Similar letters of reference indicate corresponding parts.

A represents the shaft or spindle, to which it is desired to impart a slow and powerful rotary motion, as for the live spindle of a metal-turning lathe or other similar devices.

It works in suitable bearings in housings, and is provided with a disk, C, permanently connected to it.

E represents a set of hollow cone-pulleys, having a bored central sleeve, F, and fitted to work loosely on the said shaft.

One end of this sleeve works against the inner end of the hub of the disk C, and is provided with a pinion, G, which gears into wheels H, journalled on studs I projecting from the flange.

These wheels are provided with pinions shown in dotted lines in fig. 2, and gearing into other wheels K also on studs projecting from the flange C.

These latter wheels gear with pinions M, journalled on studs N, projecting from the disk C, and passing through sleeves of the said pinions projecting through radial arms O, connected to a ring, P, encircling the pinion G, and connected to sliding arms R, extending through the disk C.

This ring P has passages cut through it on two sides for wheels H to work up to the pinion. It may be otherwise arranged to make room for the pinions.

S represents a fixed rim, toothed on its inner face, and gearing with the pinions M.

The motion is transmitted from the pulleys to the pinions M, through the above-described system of gearing, and as the wheel S, into which they gear, cannot move, it follows that the disk C, to which the pinions are connected, will have a slow rotary movement, as much less than that of the sleeve F, as is due to the increase in number of the teeth of the wheels.

The arrangement of wheels herein shown, will cause the shaft A to move in the same direction as the pulleys move, but any other arrangement may be adopted as to the number of teeth and wheels.

In order to disconnect this gearing, and so connect the pulleys and the shaft A, that they will move at the same speed, the pinions M are made to slip on their studs so as to pass beyond the teeth of the fixed wheel S, and engage their hubs M' in recesses Q in the cone-pulleys, and to cause this movement, the arms Q are made to slide back and forth by an oscillating spirally-grooved ring, T, on the hub of the disk C, into the grooves of which the bent ends of the arm R project.

The turning of this ring in one direction, will move the said pinions M out of gear with the wheel S, and in the other direction into gear therewith, thus affording a simple and ready means of changing for fast or slow motion.

This arrangement of gearing is all confined within the shell of the cone-pulleys, out of the way of danger to the attendant, free from dust, and is much more desirable than the ordinary back-gear arrangement of turning-lathes.

The hollow cones need not, however, be necessarily used, as any arrangement of pulleys on the sleeve P may be used.

Having thus described my invention,

What I claim as new, and desire to secure by Letters Patent, is—

1. The combination of the shaft A, disk C, sleeve F, and pinion thereon, sliding arms O, pinions M, intermediate wheels, and fixed wheel S, when arranged for communicating a slow motion to the shaft A from the said sleeve F, or pulleys thereon, substantially as specified.

2. The combination of the arms O, arms P, and oscillating spirally-grooved ring, T, substantially as specified.

3. The arrangement of the sliding arms O, pinions M, studs N, and recessed cone-pulleys, all substantially as specified.

ADIN GAUNTT.

Witnesses:
GEO. F. ALLEN,
W. C. MELDRON.